UNITED STATES PATENT OFFICE 2,364,033

SUBSTITUTED PROPYLAMINOAROMATIC SULPHONIC ACIDS

David W. Woodward, Wilmington, Del., assignor to E. I. du Pont de Nemours & Company, Wilmington, Del., a corporation of Delaware No Drawing. Application March 31, 1942, Serial No. 437,085

1 Claim. (Cl. 260—509)

This invention relates to new dye intermediates. More particularly it relates to dye intermediates suitable for the preparation of azo dyes and for use in photographic color processes. Still more particularly it relates to N-(3-halo-2-hydroxy-propyl)aminoaromatic sulphonic acids and their preparation.

An object of this invention is to provide a new group of dye intermediates. A further object is to provide a new group of dye intermediates which can be condensed with aliphatic or aromatic amines to form still further useful aromatic amines. Another object is to produce dye intermediates from available reactants. A still further object is to produce new organic compounds involving relatively simple procedural steps. Still other objects will be apparent from the following description of the invention.

It has been found that new and useful organic compounds, namely, N-(3-halo-2-hydroxyalkyl) aminoaromatic sulphonic acids and their water-soluble salts may be prepared by reacting in aqueous solution a primary or secondary amino aromatic sulphonic acid neutral salt, and particularly a primary or secondary aminonaphthalene sulphonic acid neutral salt with an epihalohydrin, especially epichlorohydrins and epibromhydrins. The reaction is preferably carried out at room or moderate temperatures, e. g. 40 to 80° C. whereby the oxide ring reacts with the amine and forms a beta-hydroxyalkylamine linkage. At least one molar equivalent of the epoxide per amino group of the aminoaromatic sulphonic acid is formed. Excellent yields on the order of 85% of the theoretical and better are obtained. Substantially no by-products are formed and the N-(3-halo-2-hydroxypropyl) aminoaromatic sulphonic acid is obtained by acidification and cooling, or the salt can be recovered by cooling to effect crystallization, by salting out, or by evaporation. Ordinarily, no further purification is necessary. The salts may be converted to free acids by acidification of an aqueous solution and the free acids can be recovered in like manner.

In a related aspect of the invention it has been found that the above described (N-(3-halo-2-hydroxyalkyl)aminoaromatic sulphonic acids and their water-soluble salts may be prepared by reacting in an aqueous medium primary or secondary aminonaphthalene sulphonic acid neutral salts with a di-halohydrin, especially chlorohydrins and bromohydrins.

While the broader aspects of the invention are concerned with compounds containing aromatic nuclei including the benzene ring, compounds containing aromatic nuclei of the naphthalene series constitute a preferred aspect. Still more preferred are the naphthalene derivatives which comprise a naphthalene nucleus having attached to nuclear carbon atoms thereof a radical of the general formula:

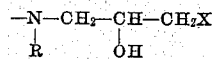

wherein R is a hydrogen atom or an alkyl radical of 1 to 3 carbon atoms and X is a halogen taken from the group consisting of chlorine and bromine.

A group of such compounds which are of particular utility as dye intermediates may be represented by the general formula:

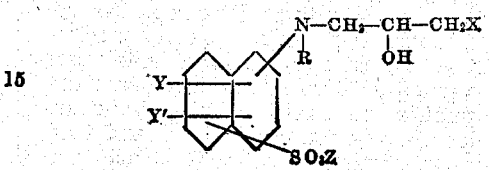

wherein R is a hydrogen atom or an alkyl radical of 1 to 3 carbon atoms and Y and Y' are the same or different and represent hydrogen or a substituent which may be present in dye intermediates including hydrocarbon radicals, e. g. normal, primary, secondary, tertiary and iso-alkyl; cycloalkyl, aryl, aralkyl, etc.; alkoxy, aryloxy, carboxy, nitrile, halogen, hydroxyl, nitro, sulphonic, sulphonamide, alkanesulphonyl, amino, acylamino, alkylamino, etc.; and Z represents hydrogen or an alkali metal. The hydrocarbon radicals may be substituted by halogen atoms such as chlorine and bromine.

The above mentioned substituent groups vary the shade, solubility and/or other properties of the dye prepared from the N-(3-halo-2-hydroxypropyl)aminonaphthalene sulphonic acids and their water-soluble salts just described. The particular nature of Y and Y' will vary with the specific use for which the compounds are intended or for the particular shade or effect desired. For instance, Y may be a hydroxyl group in the ring not containing the hydroxy hydrocarbon halide-substituted amino group when the compounds are intended to be used in the manufacture of azo dyes. When the compounds are to be used for preparing photographic dye intermediates for chromogenic color formation the hydroxy hydrocarbon halide-substituted amino group is a secondary amino group and in an alpha position of the naphthalene ring, and Y may be hydrogen or a hydroxyl group which latter group is located in the alpha position of the adjacent ring.

The invention will be further illustrated but is not intended to be limited by the following examples wherein the parts stated are parts by weight unless otherwise specified.

Example I

To 1500 parts of boiling water is added 260 parts of the purified sodium salt of M-acid (1-amino-5-naphthol-7-sulphonic acid) and the solution is stirred rapidly in a closed vessel at 55° C. while 105 parts of epichlorhydrin is added during ½ hour. After an additional half hour 10 parts of decolorizing charcoal is added with stirring, the mixture filtered and then acidified with 100 parts of hydrochloric acid of specific gravity 1.19. On cooling the solution, white crystals separate which are filtered at 5° C. to yield 325 parts of dried material representing a 97% yield. Analysis confirms a compound of the structural formula:

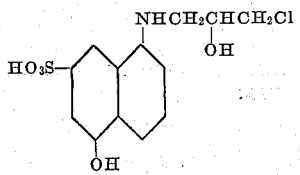

Calculated for $C_{13}H_{14}O_5NClS$. $N=4.22$, $Cl=10.7$. Found: $N=4.20$, $Cl=11.0$. The potassium salt of M-acid can be substituted in this reaction.

*Example II*

To 1000 parts of hot water is added 223 parts of Laurent's acid (naphthylamine-1,5-sulphonic acid) and 40 parts of sodium hydroxide. The solution is strongly agitated in a closed vessel at 60° C. while 100 parts of epichlorhydrin is added during a period of 35 minutes. After an additional 30 minutes, 10 parts of decolorizing charcoal is added, the mixture is filtered, and then acidified with 100 parts of hydrochloric acid s. g. 1.19. On cooling the solution, white crystals separate which are filtered at 10° C. to yield dried material representing a 95% yield. Analysis confirms a compound of the structural formula:

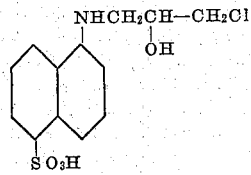

Calculated for $C_{13}H_{14}O_4NSCl.H_2O$. $Cl=10.6$. Found: $Cl=10.5$.

*Example III*

To 1000 parts of hot water containing 65 parts of sodium carbonate is added 223 parts of Cleve's acid (naphthyl-amine-1,6-sulphonic acid) and the solution is stirred rapidly in a closed vessel maintained at about 60° C. while 105 parts of epichlorhydrin is added during a period of 35 minutes. After an additional 30 minutes, 10 parts of decolorizing charcoal is added and the mixture filtered, acidified with 100 parts of hydrochloric acid s. g. 1.19. On cooling the solution, white crystals separate which are filtered at 5° C. to yield dried material representing an 85% yield of white crystals, the analysis of which agrees with a compound of the formula:

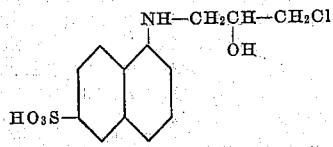

Calculated for $C_{13}H_{14}O_4N-SCl.H_2O$. $Cl=10.6$. Found: $Cl=10.6$.

*Example IV*

To a boiling mixture of 800 parts of water and 800 parts of ethanol in a closed reactor with a return condenser and containing 261 parts of the dried sodium salt of J-acid (2-amino-5-naphthol-7-sulphonic acid) is added 450 parts of 1,3-dichlorohydrin and the mixture boiled and stirred for ten hours while a solution of 62 parts of sodium carbonate monohydrate in 200 parts of water is added at such a rate that the solution is maintained in a neutral condition. The mixture is concentrated by evaporation, the excess dichlorohydrin is removed by steam distillation, 100 parts of hydrochloric acid of specific gravity 1.19 is added and the mixture cooled. Crystals of N - (3-chloro-2-hydroxypropyl) -J-acid are formed.

*Example V*

To 1500 parts of boiling water are added 341 parts of the monosodium salt of H-acid (1-amino-8-naphthol-3,6-disulphonic acid) and 62 parts of sodium carbonate monohydrate. The solution is stirred rapidly in a closed vessel at 55° C. while 105 parts of epichlorohydrin is added during one-half hour. After an additional half hour 10 parts of decolorizing charcoal is added and the mixture filtered, acidified with 100 parts of hydrochloric acid of specific gravity 1.19 and salted with 200 parts of sodium chloride. The solution is cooled. Crystals of N-(3-chloro-2-hydroxy)-H-acid monosodium salt are formed.

*Example VI*

To 800 parts of hot water are added 219 parts of p-nitroaniline-o-sulphonic acid and 40 parts of sodium hydroxide dissolved in 100 parts of water. The solution is strongly agitated in a closed vessel at 50° C. while 110 parts of epichlorohydrin is added during a period of 30 minutes. After an additional 30 minutes 100 parts of hydrochloric acid of specific gravity 1.19 and 200 parts of sodium chloride are added. On cooling, crystals of 2-N-(3-chloro-2-hydroxypropyl)-amino-5-nitrobenzene sulphonic acid of the following formula are formed:

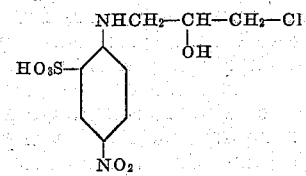

This intermediate may be used as such or reduced in water solution with iron filings to the corresponding p-phenylenediamine derivative and used as a diazo base.

In place of the specific amino naphthalene sulphonic acid salts of the above examples may be substituted the lithium, sodium or potassium salts of the following naphthalene sulphonic acid compounds:

Aminonaphthol sulphonic acids:
    Gamma (2,8,6)
    S (1,8,4)

Aminonaphthol disulphonic acids:
    K (1,8,4,6)
    2R (2,8,3,6)
    2S (1,8,2,4)

Naphthylamine sulphonic acids:
    Naphthionic (1,2 or 1,4)
    Laurent's (1,5)
    Cleve's (1,6 and 1,7)
    Peri (1,8)
    Tobias (2,1)
    Dahl's (2,5)
    Brönner's (2,6)
    Amino (F 2,7)
    Phenyl peri (1-phenyl-aminonaphthalene-8-sulphonic acid)

Naphthylamine disulphonic acids:
  Amino G (2,6,8)
  Amino R (2,3,6)
  Dahl's (1,4,6 and 1,4,7)
Aminobenzene sulphonic acids including:
  p-chloro-aniline-o-sulphonic acid
  p-nitroaniline-o-sulphonic acid
  o-toluidine-m-sulphonic acid
  p-toluidine-m-sulphonic acid
  diaminostilbenedisulphonic acid
  1 - amino - 2 - methoxynaphthalene - 6-sulphonic acid
  dianisidine disulphonic acid
  N-ethylaniline-m-sulphonic acid
  1 - N - benzylamino-5-naphthol-6-sulphonic acid
Aminoanthraquinone sulphonic acids.

Any of the above compounds containing other nuclear substituents, such as aryl, alkyl, alkoxy, halogen, nitro, sulphonic, carboxyl, etc., may equally well be used. The N-methyl, N-ethyl, N-isopropyl acids corresponding to the above may be used in similar manner. The above-mentioned acids may further contain substituents Y and Y' as described above with regard to Formula 1. Suitable alkyl radicals include methyl, ethyl, isopropyl, tertiary butyl, dodecyl, etc. Among the useful alkoxy and aryloxy substituents are the methoxy, ethoxy and phenoxy radicals. Cycloalkyl groups include the cyclohexyl and methylcyclohexyl radicals.

Instead of using the lithium, sodium or potassium salts of the above acids, the free acids may be used and an equivalent amount of an alkali metal hydroxide or carbonate added to the aqueous solution prior to or during the amine condensation reaction.

When polybasic acid compounds are used it is usually satisfactory to use either the mono or poly, e. g. di salt, but it is preferable to use the salt which is more soluble. Of course, it is not necessary to have the salt all in solution but this is desirable because the reaction occurs more readily in a homogeneous solution.

In place of the epichlorohydrin of Examples I, II, etc. there may be substituted 150 parts of epibromohydrin in which case the corresponding substituted bromopropyl derivative will be formed. The hydrogen atoms of the above described epihalohydrins and halohydrins may be replaced by one or more alkyl radicals without impairing the utility of the resulting dye intermediate. In general from 1 to 1.25 molar equivalents of epoxide per molar equivalent of aminoaromatic sulphonic acid should be used.

The temperature of the reaction (50–60° C.) has been found to yield the best results in general, although it is not critical. In this reaction, temperatures from below 20° to above 100° C. are practical. At a lower temperature the acid salt is less soluble and the reaction is slower, while at a higher temperature part of the epoxide is hydrolyzed. A period of 20 minutes to 2 hours or more is generally sufficient to effect condensation.

It has been found in a related aspect of the invention that in place of the epoxides the 1,3-dihalohydrins can be used to form the novel products above described. The 1,3-dihalohydrins are less reactive and a much larger amount must be used to prevent the formation of the bis-compound. Thus, about 400 parts of the 1,3-dichlorohydrin or about 680 parts of the 1,3-dibromohydrin is used as compared with the amount of epichlorohydrin of Example I. The best reaction temperature will be about 100° C. and the reaction requires at least 10–20 hours. During this time, it is necessary to add strong sodium hydroxide solution occasionally to maintain neutrality in the solution.

Mineral acids other than hydrochloric may be used in the precipitation, but it is always desirable to use at least enough to decompose all of the acid salt. If it is desired to obtain the salt instead of the free acid, the solution may be cooled without acidification and the salt isolated. If either the acid or the salt is found to be too water-soluble, it may be recovered either by addition of sodium chloride to cause precipitation or by evaporation of the water. The use of decolorizing charcoal prior to acidification is optional but usually improves the color of the product.

The products of this invention constitute a new and valuable class of water-soluble dye coupling components useful both per se for the production of dyes and by virtue of their ready reaction with other products to yield other types of coupling components.

Azo dyes as well as quinoneimine dyes produced from these products are, in general, brighter and deeper in shade and in many cases possess greater affinity for textiles, in comparison with the parent aminosulphonic acids.

Another advantage is the ease with which these intermediates may be condensed with amine-containing dye intermediates to form bi-nuclear dye intermediates which constitute a valuable class of components for producing cotton and wool dyes.

One of the most important uses for these products is in reaction with aliphatic amines to form the secondary or tertiary amine or quaternary salt. When low molecular weight primary and secondary amines are used, dye intermediates are formed which are of value in producing water-soluble dyes possessing basic groups in the side chain and these can be used for coloring textiles such as wool or can be converted through phospho-tungstic acid into insoluble pigments. When high molecular weight amines are used, the products are important in photographic color processes such as those described in U. S. Patents 1,102,028, 2,133,937, 2,179,228, 2,179,238 and 2,179,239 because they are free from migration and yet, due to the sulphonic acid groups, permit solution in aqueous media so that they may readily be incorporated in photographic emulsion layers. They may also be used in the azo-reversal processes of Woodward application, Serial No. 335,416.

As many apparently widely different embodiments of this invention may be made without departing from the spirit and scope thereof, it is to be understood that the invention is not to be limited except as defined by the appended claim.

What is claimed in:

1-(3'-chloro-2'-hydroxy propyl)-amino-5-hydroxy naphthalene-7-sulphonic acid.

DAVID W. WOODWARD.